United States Patent
Hoffer et al.

(10) Patent No.: US 8,473,758 B2
(45) Date of Patent: Jun. 25, 2013

(54) I/O PORT POWER CONTROL SYSTEM AND METHOD

(75) Inventors: Cary J. Hoffer, Albany, OR (US); David A. Pipho, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1356 days.

(21) Appl. No.: 11/799,272

(22) Filed: Apr. 30, 2007

(65) Prior Publication Data

US 2008/0270809 A1 Oct. 30, 2008

(51) Int. Cl.
G06F 1/00 (2006.01)

(52) U.S. Cl.
USPC .......................................... 713/300

(58) Field of Classification Search
USPC .......................................... 713/300
See application file for complete search history.

(56) References Cited

U.S. PATENT DOCUMENTS

| | | | |
|---|---|---|---|
| 6,516,418 | B1 | 2/2003 | Lee |
| 7,430,679 | B2 * | 9/2008 | Tevanian, Jr. ................. 713/324 |
| 7,451,328 | B2 * | 11/2008 | Hsieh ............................ 713/300 |
| 2002/0169915 | A1 | 11/2002 | Wu |
| 2006/0035527 | A1 * | 2/2006 | Numano ........................ 439/668 |
| 2007/0067659 | A1 | 3/2007 | Tevanian, Jr. |
| 2007/0220290 | A1 * | 9/2007 | Tsai et al. .................... 713/300 |

OTHER PUBLICATIONS

Toshiba Unveils Innovative Sleep-and-Charge USB Ports, Apr. 1, 2007.*
Pericom, Pericom Announces USB Sleep-and-Charge Solution for Notebook and Mobile Device Chargers, Sep. 21, 2009.*
http://www.computing.net/answers/hardware/usbno-power/46954.html ,Usb-No Power, Jan. 21, 2007.*

* cited by examiner

*Primary Examiner* — Mark Connolly

(57) ABSTRACT

An input/output (I/O) power control system comprises an electronic device having at least one I/O port and a controller, wherein the controller is configured to, while the electronic deice is powered off, detect coupling of an external device to the at least one I/O port and, in response to detecting the coupling, provide power to the I/O port.

18 Claims, 3 Drawing Sheets

I/O PORT POWER CONTROL SYSTEM AND METHOD

Electronic devices generally have a number of input/output (I/O) ports for connecting a variety of different types of peripheral devices to the electronic device (e.g., MP3 players, cameras, pointing devices, cellular telephones, etc.). Many of such peripheral devices are able to be powered and/or charged (e.g., an internal rechargeable battery source of the peripheral device) based on power received through the I/O port from the electronic device. However, many types of peripheral devices are used while the electronic device is being used and/or is powered on, and then the peripheral device is plugged into the I/O port of the electronic device when finished for recharging. Thus, if the electronic device is powered off when finished using the peripheral device, the peripheral device may not be recharged because power is no longer available from the I/O port.

DETAILED DESCRIPTION OF THE DRAWINGS

Figure 1:
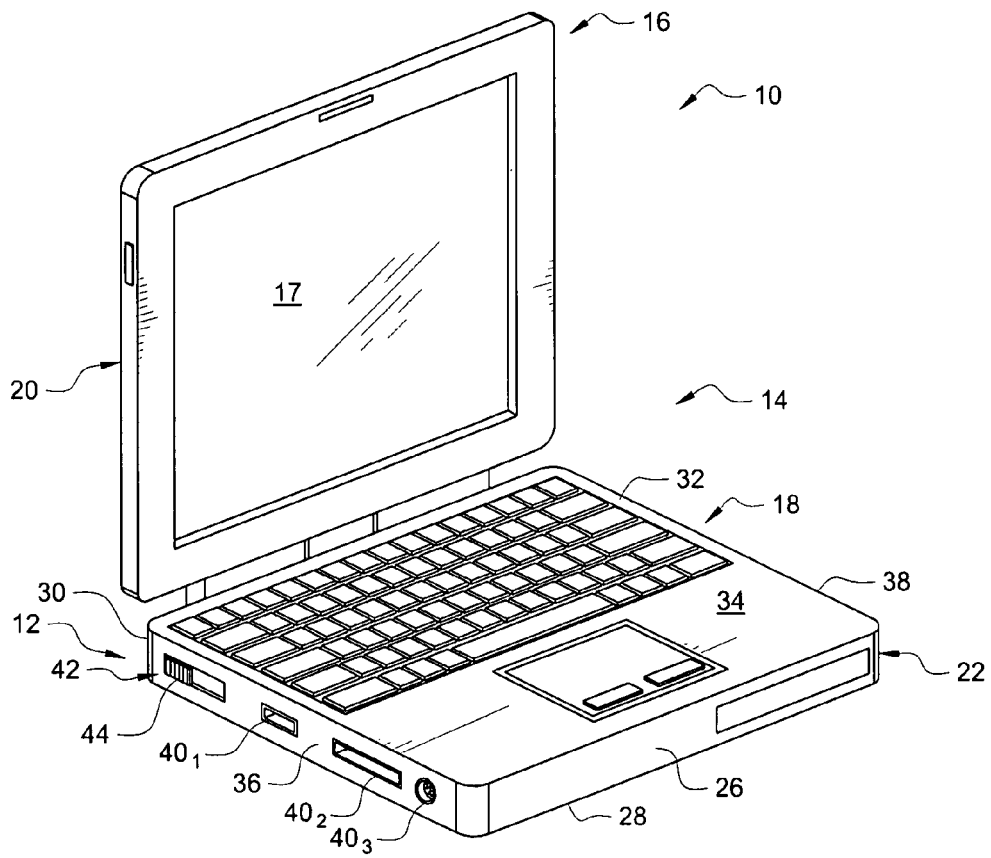
FIG. 1 is a diagram illustrating an electronic device in which an embodiment of an input/output (I/O) port power control system is employed to advantage.

FIG. 1 is a diagram illustrating an electronic device 10 in which an embodiment of an input/output (I/O) port power control system 12 is employed to advantage. In the embodiment illustrated in FIG. 1, electronic device 10 comprises a notebook computer 14 having a display member 16 with a display screen 17 rotatably coupled to a base member 18. However, it should be understood that electronic device 10 may comprise other types of devices such as, but not limited to, a tablet computer, desktop computer, gaming device, personal digital assistant, media player or any other type of device configured to have an external peripheral device coupled thereto. In the embodiment illustrated in FIG. 1, display member 16 and base member 18 each comprise a housing 20 and 22, respectively, formed of a number of walls for surrounding and/or otherwise supporting various components of electronic device 10. For example, in the embodiment illustrated in FIG. 1, housing 22 comprises a front wall 26, a bottom wall 28, a rear wall 30, an upper wall 32 defining a working surface 34, and a pair of side walls 36 and 38.

In FIG. 1, housing 22 comprises a number of I/O ports $40_1$-$40_3$ disposed therein to facilitate coupling of electronic device 10 to various types of external peripheral devices. In the embodiment illustrated in FIG. 1, I/O ports $40_1$-$40_3$ are located on side wall 36; however, it should be understood that I/O $40_1$-$40_3$ ports may be otherwise located on electronic device 10 such as in display member 16 or in both base member 18 and display member 16. I/O ports $40_1$-$40_3$ may comprise any type of port such as, but not limited to, a universal serial bus (USB) port(s), an IEEE-1394 port(s), a digital video interface (DVI) port(s), a serial port(s), a parallel port(s), an Ethernet port, etc.

In the embodiment illustrated in FIG. 1, system 12 comprises a power controller 42 for controlling the availability of power to one or more of $40_1$-$40_3$ ports. For example, in some embodiments, controller 42 is configured to enable power to be supplied to one or more I/O ports $40_1$-$40_3$ while electronic device 10 is powered off. As used herein, electronic device 10 is considered to be powered "off" when electronic device 10 is shut off and/or powered down to a level such that power is generally not available to I/O ports 40. Thus, embodiments of system 12 and/or controller 42 enable power to be supplied to I/O port(s) 40 when electronic device 10 is powered off. In some embodiments, controller 42 is configured to detect engagement of a peripheral device to a particular one of I/O ports $40_1$-$40_3$ and, in response thereto, automatically cause power to be supplied to the particular I/O port $40_1$-$40_3$ even while electronic device 10 is powered off. In some embodiments, controller 42 is configured to enable a user of electronic device 10 to select all or particular I/O ports $40_1$-$40_3$ that would have power made available to it/them based on what power source(s) is available to electronic device 10 to provide power to the selected I/O ports $40_1$-$40_3$ (e.g., depending on whether an external alternating current (AC) power source is connected to electronic device 10 or whether an internal power source, such as internal battery, would be providing the power). Controller 42 may be configured as hardware, software, firmware, or a combination thereof.

In the embodiment illustrated in FIG. 1, controller 42 comprises a switch 44 coupled to internal circuitry of electronic device 10 that, when actuated and/or otherwise switched to an "on" position, configures electronic device 10 to have power supplied to one or more I/O ports $40_1$-$40_3$ when electronic device 10 is powered off. In FIG. 1, switch 44 comprises a slidable switch disposed on an exterior of electronic device 10 on side 36 of housing 22 to enable a user of electronic device 10 to physically engage switch 44 and actuate switch 44 to an "on" position. However, it should be understood that switch 44 may be otherwise located. It should also be understood that switch 44 may comprise a different type of mechanism, (e.g., a depressable button, a contact-based sensor, etc.). In FIG. 1, a single switch 44 is illustrated; however, it should be understood that additional switches 44 may be provided. For example, in some embodiments, a single switch may be associated with one or a plurality of I/O ports $40_1$-$40_3$ such that actuation of switch 44 to an "on" position enables power to be supplied to the particular I/O ports $40_1$-$40_3$ associated with the particular switch 44. It should also be understood that in some embodiments, each I/O port 40 may have its own switch 44 associated therewith. Additionally, it should be understood that switch 44 may have a plurality of "on" positions or states. For example, in some embodiments, switch 44 may have one "on" position or state such that power is made available to the particular I/O port 40 only if an external power source (e.g., an external AC source) is connected to electronic device, and another "on" position or state such that power is made available to the particular I/O port 40 regardless of the type of power sources available (e.g., power provided by an external source if available but, if unavailable, power provided by an internal battery of electronic device 10).

Figure 2:
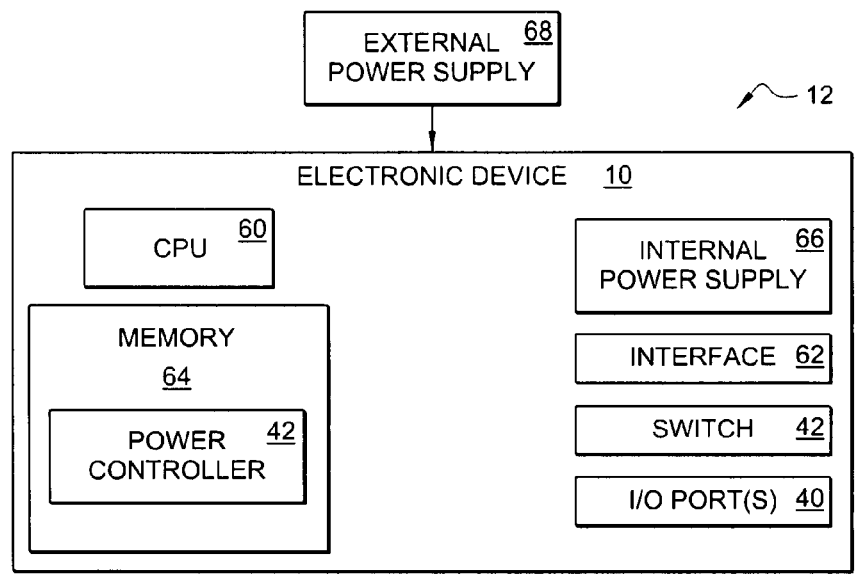
FIG. 2 is a block diagram illustrating the electronic device and I/O port power control system of FIG. 1.

FIG. 2 is a block diagram illustrating electronic device 10 and I/O port power control system 12 of FIG. 1. In the embodiment illustrated in FIG. 2, electronic device 10 comprises a central processing unit (CPU) 60, an interface 62, a memory 64, an internal power supply 66, and I/O port(s) 40. Interface 62 may comprise any type of device for outputting information from electronic device 10 to a user and/or receiving information from a user such as, but not limited to, a keypad, display, mouse, or other type of input and/or output element. Internal power supply 66 may comprise any type of rechargeable power supply configured as an internal battery of electronic device 10, a travel or other type of battery couplable to electronic device 10, or other type of rechargeable power source having a generally limited duration of power-providing capability. In the embodiment illustrated in FIG. 1, power controller 42 is illustrated as being stored in memory 64 so as to be accessible and/or executable by CPU 60. For example, in some embodiments, power controller 42 may comprise a set of executable instructions or logic for controlling various power-related functions associated with I/O ports(s) 40 and/or for receiving input from a user (e.g., via interface 62) for controlling power provided to I/O port(s) 40. However, it should be understood that power controller 42 may also comprise hardware and/or firmware elements. In the embodiment illustrated in FIG. 2, an external power supply 68 is also illustrated as being coupled to electronic device 10. External power supply 68 may comprise an AC source available through a power adapter, an AC-to-direct current (DC) converter, or other type of generally constant power supply. It should be understood that, even though power supply 68 is illustrated in FIG. 2 as being connected to electronic device 10, the connection to power supply 68 may sometimes be absent (e.g., relying solely on power from power supply 66 to power electronic device 10). It should also be understood that power supply 68 may also provide power to electronic device via an intermediate device (e.g., power supplied to electronic device 10 while electronic device 10 is docked in a docking station).

In some embodiments, power controller 42 is configured to receive input from a user (e.g., via interface 62) to perform variation actions associated with providing power to I/O ports 40 when electronic device 10 is powered off. For example, in some embodiments, controller 42 is configured to designate certain I/O port(s) 40 to have power made available thereto based on a user selection and/or designation (e.g., the user may select and/or otherwise designate that the USB ports of electronic device 10 should have power supplied thereto even when electronic device 10 is powered off or that a particular designated USB port should have power supplied thereto). In some embodiments, controller 42 is configured to provide power to one or more I/O port(s) 40 based on what type of power supply is available and/or coupled to electronic device 10 (e.g., the user may designate that power be supplied to one or more I/O ports 40 only when power supply 68 is coupled to electronic device 10, or the user may designate that power be made available to one or more I/O ports 40 regardless of whether power supply 68 is coupled to electronic device (e.g., thereby relying on power supply 66 in the absence of power supply 68)). The input to power controller 42 may be through a graphical user interface (GUI) or other software-based interface 62.

Figure 3:
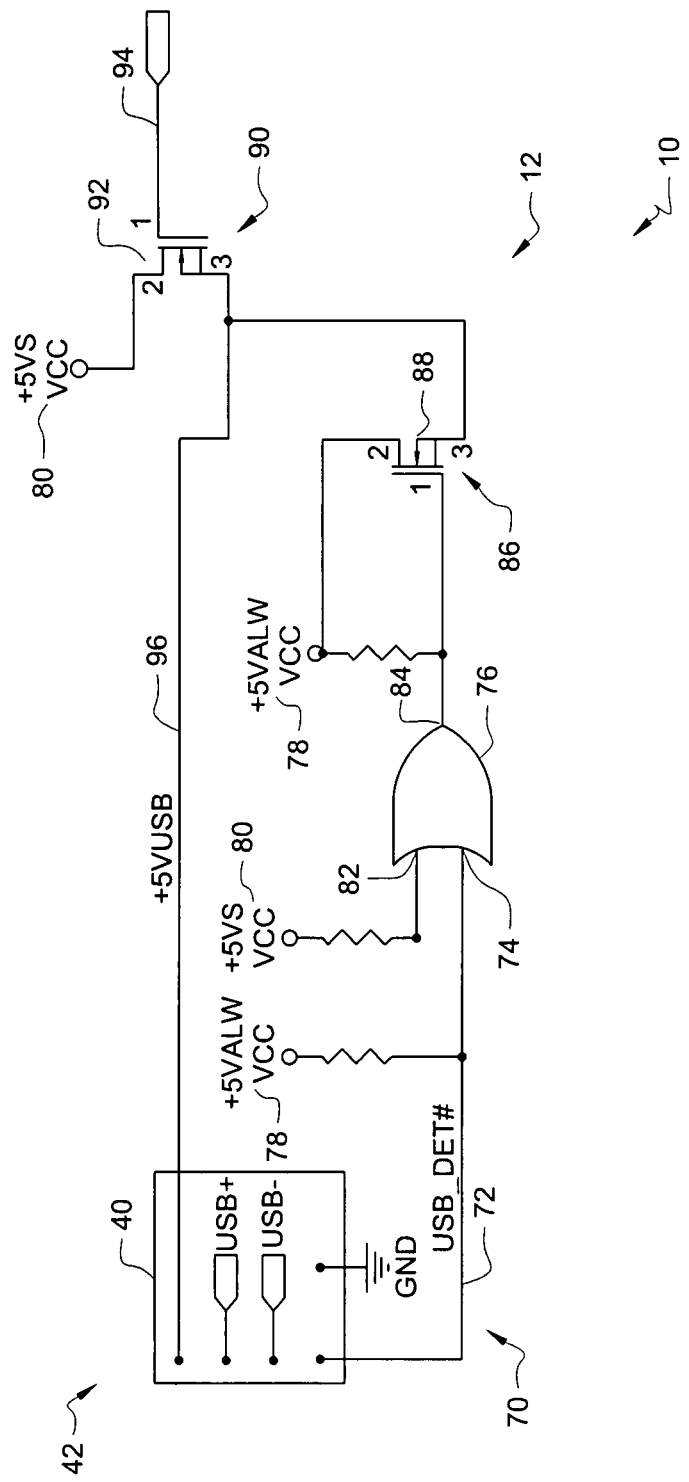
FIG. 3 is a circuit diagram illustrating an embodiment of the I/O power control system.

FIG. 3 is a circuit diagram illustrating an embodiment of I/O power control system 12. In the embodiment illustrated in FIG. 3, power controller 42 is configured as a circuit 70 used to detect the presence or coupling of a peripheral device to I/O port 40 and, in response to detecting the presence or coupling of a peripheral device to I/O port 40, causing power to be supplied to I/O port 40. For ease of description and illustration, FIG. 3 is described herein in the context of a USB I/O port 40; however, it should be understood that circuit 70 may be configured and/or otherwise adapted for other types of I/O ports 40 and/or other types of power levels.

In the embodiment illustrated in FIG. 3, I/O port 40 comprises a detect line 72 (identified as "USB_DET#" in FIG. 3) coupled to an input 74 of an OR gate 76 and also coupled to a five volt power supply 78 (identified as "+5VALW" in FIG. 3). Power supply 78 (+5VALW) is associated with a power supply available from either an internal or external source (e.g., either a battery or an external AC source) coupled to electronic device 10. A five volt power supply 80 (identified as "+SVS" in FIG. 3) is coupled to an input 82 of OR gate 76. Power supply 80 (+5VS) represents a five volt power level available when electronic device 10 is powered on (e.g., whether powered on by an internal or external power source) in a fully operational state (as opposed to a sleep or standby mode). Thus, for example, if electronic device 10 is powered on, input 82 to OR gate 76 is HI (regardless of the type of power source powering electronic device 10).

In the embodiment illustrated in FIG. 3, an output 84 of OR gate 76 is coupled to power supply 78 (+5VALW) and is also coupled to a switch 86 in the form of an N-channel field effect transistor (FET) 88 such output 84 is coupled to the gate (pin 1) of FET 88. The source (pin 2) of FET 88 is coupled to power supply 78 (+5VALW), and the drain (pin 3) of FET 88 is coupled to a switch 90 in the form of an N-channel field effect transistor (FET) 92 such the drain (pin 3) of FET 88 is coupled to the drain (pin 3) of FET 92. The source (pin 2) of FET 92 is coupled to power supply 80 (+5VS), and the gate (pin 1) of FET 92 is coupled to a signal line 94 (e.g., from a southbridge chipset or otherwise) that is used to indicate whether electronic device 10 is in a sleep or standby mode. For example, in some embodiments, if electronic device 10 has been placed in a sleep or standby mode, signal line 94 is HI, thereby not enabling FET 92 and isolating a power line 96 from power supply 80 coupled to the source (pin 2) of FET 92. Power line 96 is coupled to I/O port 40 and is used to provide power to I/O port 40. Thus, in operation, if electronic device 10 is not in a sleep or standby mode and is in an operational mode, signal line 94 is LO, thereby enabling FET 92 and causing power supply 80 (+5VS) to provide power to I/O port 40 on power line 96.

Thus, in operation, if electronic device 10 is powered on, input 82 to OR gate 84 is HI, thereby resulting in the gate (pin 1) of FET 88 being HI, and thereby not enabling FET 88. Correspondingly, if electronic device 10 is powered on and not in a sleep or standby mode, signal line 94 is LO, thereby enabling FET 92 and causing power top be supplied to I/O port 40 on line 96 by power supply 80 (+5VS). If electronic device is powered on but in a sleep or standby mode, signal line 94 is LO, thereby enabling FET 92 and causing power supply 80 (+5VS) to provide power to I/O port 40 on power line 96.

Figure 4:
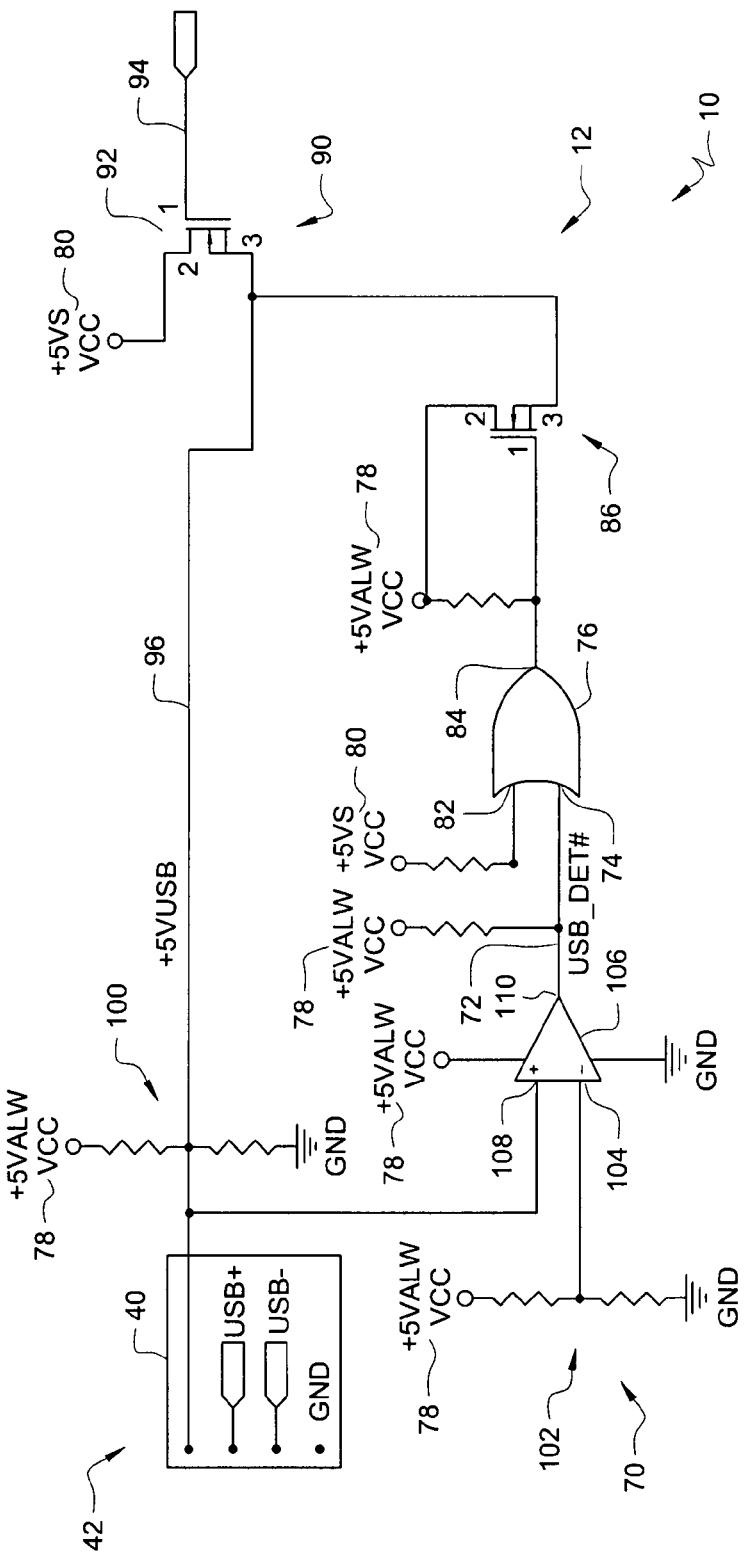
FIG. 4 is another diagram illustrating an embodiment of the I/O power control system.

If electronic device 10 is powered off, input 82 to OR gate 76 will be LO. Further, in response to a peripheral device being coupled to I/O port 40, detect line 72 (USB DET#) will be pulled LO, thereby resulting in output 84 of OR gate being LO, and thereby enabling FET 88 such that power supply 78 (+5VALW) provides power to I/O port 40 via power line 96. Thus, in operation, in response to detecting a peripheral device being connected to I/O port 40, system 12 is configured to automatically provide power to I/O port 40 even when electronic device 10 is powered off. In some embodiments, electronic device 10 and/or circuit 70 may be configured such that power is provided to I/O port 40 when electronic device 10 is powered off only if an external AC power source is connected to electronic device 10. However, in other embodiments, electronic device 10 and/or circuit 70 may be configured such that power is provided to I/O port 40 when electronic device 10 is powered off from an external AC power source if available or connected to electronic device 10 and, if unavailable, a battery source. It should also be understood that controller 42 may also be configured to receive user input to define various operating parameters of system 12. In FIG. 1, I/O port 40 is illustrated as having detect line 72 as an additional line and/or connection for a USB-type of port;

however, it should be understood that circuit 70 and/or I/O port 40 may be otherwise configured, for example, as illustrated in FIG. 4.

FIG. 4 is another diagram illustrating an embodiment of I/O power control system 12. For ease of description and illustration, FIG. 4 is described herein in the context of a USB I/O port 40; however, it should be understood that circuit 70 may be configured, and/or otherwise adapted for other types of I/O ports 40 and/or other types of power levels. In FIG. 4, circuit 70 of system 12 comprises a voltage divider 100 coupled to power line 96, and a voltage divider 102 coupled to an input 104 of a balanced comparator 106. An input 108 of comparator 106 is also coupled to power line 96, and an output 110 of comparator 106 is coupled to input 74 of OR gate 76. In operation, comparator 106 is used to pull input 74 LO based on an impedance change resulting from a peripheral device being coupled to I/O port 40. For example, in operation, voltage dividers 100 and 102 are balanced in the absence of a peripheral device being coupled to I/O port 40 such that output 110 would be HI on detect line 72 (USB_DET#). However, in response to a peripheral device being coupled to I/O port 40, the impedance on voltage divider 100 would cause comparator 106 to trip and output 110 to be LO on detect line 72 (USB_DET#). The operation of OR gate 76 and switches 86 and 92 for providing power to I/O port 40 is similar as to described above in connection with FIG. 3.

Thus, in some embodiments of system 12, circuit 70 is configured to automatically switch a power supply into communication with the at least one I/O port 40 in response to detecting a peripheral device being connected to such I/O port 40. In some embodiments, system 12 is configured to receive input from a user indicating select ones of I/O ports 40 that are to be controlled by controller 42 for providing power thereto when electronic device 10 is powered off. Further, in some embodiments, system 12 is configured to receive input from a user indicating that power is to be supplied to one or more I/O ports 40 when electronic device 10 is powered off by power available from an internal power supply (e.g., a battery) in the absence of an external power supply (e.g., an AC power supply) being coupled to electronic device 10. Thus, embodiments of system 12 enable power to be supplied to one or more I/O ports 40 when electronic device 10 is powered off, and system 12 enables a user to flexibly configure how and/or when power should be applied to one or more I/O ports 40 based on a selection/designation of particular I/O ports 40, the type of power available to electronic device 10, or otherwise.

What is claimed is:

1. An input/output (I/O) power control system, comprising:
an electronic device having at least one I/O port and a controller, wherein the controller is configured to, while the electronic device is powered off, detect a new coupling of an external device to the at least one I/O port and, in response to detecting the coupling, initiating provision of power to the I/O port, wherein power is provided to the I/O port while the electronic device remains powered off.

2. The system of claim 1, further comprising a switch actuatable by a user of the electronic device to provide power to the at least one I/O port.

3. The system of claim 2, wherein actuation of the switch is configured to provide power to the at least one I/O port without the external device being coupled to the at least one I/O port.

4. The system of claim 1 further comprising an internal power supply to serve as a source for providing power to the I/O port while the electronic device is powered off, wherein the controller is configured to receive input from a user designating that the controller is to provide power to the at least one I/O port in response to detecting the new coupling while the electronic device is powered off only if an external power supply is coupled to the electronic device.

5. The system of claim 1, wherein the controller is configured to receive input from a user selecting a subset of the at least one I/O port to be controlled by the controller.

6. The system of claim 1, wherein the controller comprises a control circuit configured to automatically switch a power supply into communication with the at least one I/O port.

7. The system of claim 1, wherein the controller is configured to receive input from a user designating that the controller is to provide power to the at least one I/O port from an internal power supply in the absence of an external power supply coupled to the electronic device.

8. An input/output (I/O) power control method, comprising:
detecting, by an electronic device when the electronic device is powered off, coupling of an external device to at least one I/O port of the electronic device;
in response to detecting the coupling, providing power to the at least one I/O port; and
automatically switching a power supply into communication with the at least one I/O port in response to detecting the coupling.

9. The method of claim 8, further comprising receiving actuation of a physical switch configured to, in response to being actuated, provide power to the at least one I/O port.

10. The method of claim 9, further comprising, in response to the switch being actuated, providing power to the at least one I/O port without the external device being coupled to the at least one I/O port.

11. The method of claim 8, wherein the electronic device comprises an internal power supply to serve as a source for providing power to the I/O port while the electronic device is powered off and wherein the method further comprises receiving input from a user designating that power is to be provided to the at least one I/O port in response to detecting the new coupling while the electronic device is powered off only if an external power supply is coupled to the electronic device.

12. The method of claim 8, further comprising receiving input from a user selecting a subset of the at least one I/O port to be powered in response to the coupling.

13. The method of claim 8, further comprising receiving input from a user designating that power is to be provided to the at least one I/O port from an internal power supply in the absence of an external power supply coupled to the electronic device.

14. The method of claim 8, wherein the detecting of the coupling of the external device to the at least one I/O port of the electronic device is the detection of a new coupling and wherein the provision of power to the at least one I/O port is initiation of provision of power to the I/O port.

15. An input/output (I/O) power control system, comprising:
means for detecting, by an electronic device when the electronic device is powered off, a new coupling of an external device to at least one I/O port of the electronic device; and
means responsive to detecting the coupling for initiating provision of providing power to the at least one I/O port, wherein power is provided to the I/O port while the electronic device remains powered off.

16. The system of claim 15, further comprising:
an internal power supply to serve as a source for providing power to the I/O port while the electronic device is powered off; and
means for receiving input from a user designating that power is to be provided to the at least one I/O port in response to detecting the new coupling while the electronic device is powered off only if an external power means is coupled to the electronic device.

17. The system of claim 15, further comprising means for automatically switching a power means into communication with the at least one I/O port in response to detecting the coupling.

18. The system of claim 15, further comprising means for receiving input from a user designating that power is to be provided to the at least one I/O port from an internal power means in the absence of an external power means coupled to the electronic device.

* * * * *